(12) United States Patent  
Gaur

(10) Patent No.: US 7,543,306 B2  
(45) Date of Patent: Jun. 2, 2009

(54) METHOD, SYSTEM, AND PROGRAM FOR HANDLING DEVICE INTERRUPTS IN A MULTI-PROCESSOR ENVIRONMENT

(75) Inventor: Daniel R. Gaur, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1491 days.

(21) Appl. No.: 10/612,694

(22) Filed: Jul. 2, 2003

(65) Prior Publication Data

US 2005/0015764 A1 Jan. 20, 2005

(51) Int. Cl.  
*G06F 13/00* (2006.01)

(52) U.S. Cl. .................. 719/321; 719/327; 718/100; 718/102; 710/260; 712/1

(58) Field of Classification Search .......... 719/321, 719/327; 718/102, 107, 100; 710/260; 712/1  
See application file for complete search history.

(56) References Cited

U.S. PATENT DOCUMENTS 6,631,394 B1 * 10/2003 Ronkka et al. ............ 718/100
7,219,121 B2 * 5/2007 Kaniyar et al. ............ 709/201
7,386,619 B1 * 6/2008 Jacobson et al. ........... 709/229

OTHER PUBLICATIONS

Cornell Theory Center (CTC), "Functions for Pinning Tasks to Processors", [online], © 2003 Cornell University, [retrieved on Mar. 11, 2003]. Retrieved from the Internet.  
Webopedia.com, "Definitions", [online], [retrieved on Jul. 2, 2003]. Retrieved from the Internet.

* cited by examiner

*Primary Examiner*—Andy Ho  
(74) *Attorney, Agent, or Firm*—Konrad Raynes & Victor LLP

(57) ABSTRACT

Provided are a method, system, and program implemented by a device driver executing in a computer for handling interrupts from an associated device, wherein the device driver is capable of interfacing with the associated device. The device driver periodically monitors usage of the processors in the system and pins a processor to execute the interrupt handler of the device driver based upon the monitored usage. If the usage of the pinned processor exceeds that of one or more of the other processors, the device driver may pin the interrupt handlers to a different, lower utilized processor.

20 Claims, 5 Drawing Sheets

METHOD, SYSTEM, AND PROGRAM FOR HANDLING DEVICE INTERRUPTS IN A MULTI-PROCESSOR ENVIRONMENT

BACKGROUND OF THE INVENTION

1. Field of the Invention

The present invention relates to a method, system, and program for handling device interrupts in a multi-processor environment.

2. Description of the Related Art

Computer systems may have a variety of devices including printers, network interfaces, keyboards, and disk drives which send or receive data within the system. These devices indicate the need to communicate with the rest of the system using what is commonly called an "interrupt." For example, a network controller might interrupt to signal the arrival of a new packet from the network or the successful transmission of a packet onto the network. Devices may signal the occurrence of other types of events using an interrupt.

The computer system typically has an interrupt handler which processes the event or events which triggered the interrupt. For example, many computer operating systems, such as Microsoft Windows®, Linux®, Unix®, etc., have an interrupt service routine (ISR) which responds to the receipt of an interrupt from various devices. (Microsoft and Windows are registered trademarks of Microsoft Corporation, Linux is a registered trademark of Linus Torvalds, UNIX is a registered trademark of The Open Group). These and other operating systems also execute various device driver programs that provide a software interface between the operating system and an associated device. A device driver includes device specific commands to communicate with and control the associated device. These device specific commands may be issued by an interrupt handler within the device driver (such as a device driver interrupt service routine (ISR)) for handling an interrupt generated by the associated device.

In many operating systems, upon receiving a device interrupt, the operating system identifies the device driver associated with the device that asserted the interrupt, and causes the device driver interrupt handler to be executed. Some operating systems, referred to as multiprocessing or parallel processing operating systems, permit running one or more programs on more than one processor such as a central processing unit (CPU). In computer systems having more than one CPU, various schemes have been proposed for the selection of the particular CPU to execute an interrupt handler. Some operating systems such as Microsoft Windows® have a task scheduler which selects the CPU to execute a task. In general the operating system task scheduler will select the CPU having the lightest load to execute the next task. Another technique routes all interrupts to a single processor for handling. Other systems utilize hardware-based "round-robin" algorithms which distribute interrupts evenly to processors of the system.

It is believed that there is a need in the art to provide improved techniques for executing interrupt handlers in a multiple processor computer system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Device Driver Interrupt Handling

Figure 1:
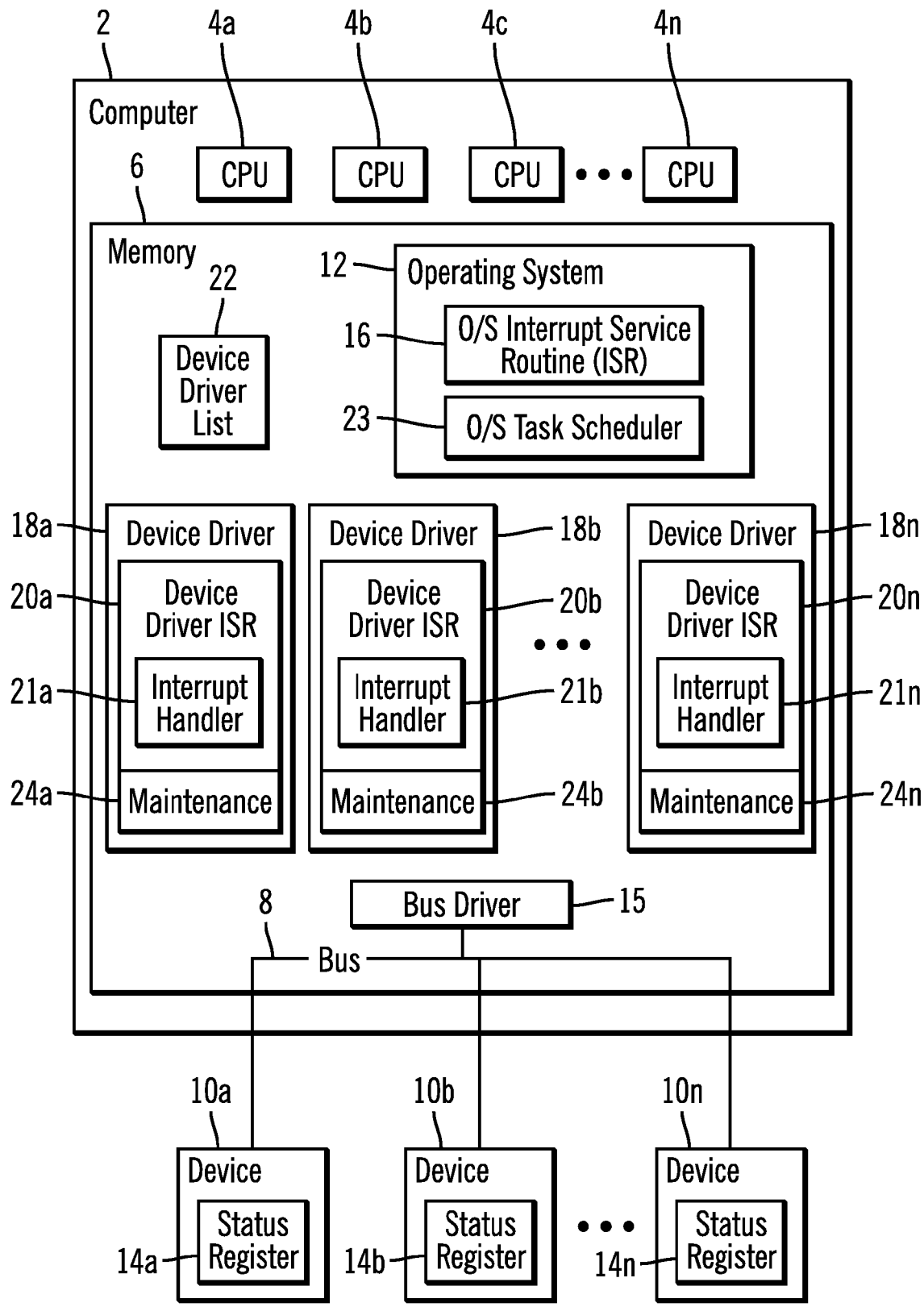
FIG. 1 illustrates a computing environment in which aspects of the invention are implemented.

FIG. 1 illustrates an example of a computing environment in which aspects of the invention may be implemented. A computer 2 includes a plurality of central processing units (CPUs) 4*a*, 4*b*, 4*c* . . . 4*n*, a volatile memory 6, a bus interface 8 on which devices communicate data and interrupts to the computer 2. A plurality of devices 10*a*, 10*b* . . . 10*n* communicate data and interrupts to the computer 2 via a bus interface 8. The bus interface 8 may be implemented using any Input/Output (I/O) bus technology known in the art, such as the Peripheral Component Interconnect (PCI), Industry Standard Architecture (ISA), the Video Electronics Standards Association (VESA), Micro Channel Architecture (MCA), Extended ISA, and any other known bus technology known in the art. The devices 10*a*, 10*b* . . . 10*n* may comprise any I/O device known in the art, such as storage devices (e.g., tape drive, hard disk drive, optical disk drive, memory card reader, etc.), storage controller, network controller, network adaptor card, video devices, printers, etc. The devices 10*a*, 10*b* . . . 10*n* include one or more status registers 14*a*, 14*b* . . . 14*n* that indicate, among other things, whether the device has asserted an interrupt on the bus 8. Although FIG. 1 only shows one bus 8, the computer 2 may include multiple busses to enable communication with the devices connected to such additional busses.

The computer 2 further includes an operating system 12, which may comprise any operating system known in the art, such as a Microsoft Windows® operating system, Linux®, a Unix® type operating system, etc. A bus driver 15 comprises a program that provides an interface between the operating system 12 and the bus 8 to enable communication between the operating system 12 and the devices 10*a*, 10*b* . . . 10*n* that communicate on the bus 8. The operating system 12 includes an interrupt service routine (ISR) component 16 that handles interrupt requests received from the devices 10*a*, 10*b* . . . 10*n* transmitted across interrupt lines (not shown) of the bus 8. The operating system 12 further loads into memory 6 and executes at least one device driver 18*a*, 18*b* . . . 18*n* for each device 10*a*, 10*b* . . . 10*n* recognized by the operating system 12. The device drivers 18*a*, 18*b* . . . 18*n* each include device specific code to enable communication between the operating system 12 and the devices 10a, 10b ... 10n. The device drivers 18a, 18b ... 18n each include an interrupt service routine (ISR) 20a, 20b ... 20n component to respond to an operating system ISR 16, and an interrupt handler (IH) component 21a, 21b, ... 21n to handle interrupt requests from the associated device 10a, 10b ... 10n. Each device driver 18a, 18b ... 18n further includes a maintenance component 24a, 24b ... 24n which can perform periodic tasks. The operating system ISR 16 utilizes a device driver list 22 that identifies all the loaded device drivers 18a, 18b ... 18n registered with the operating system 12.

The operating system 12 further includes a task scheduler 23 which decides which task or program will be run next and which one of the various CPU's 4a, 4b, 4c ... 4n will execute that program or task. In general the operating system task scheduler 23 will select the CPU 4a, 4b, 4c ... 4n having the lightest load to execute the next task.

The operating system 12 of the illustrated embodiment permits more than one task or program to run concurrently. In addition, each CPU 4a, 4b, 4c ... 4n can perform multitasking, that is, more than one program can run concurrently on each CPU 4a, 4b, 4c ... 4n. In practice, a CPU 4a, 4b, 4c ... 4n switches from executing one program to executing another program relatively quickly so as to give the appearance of simultaneously executing all of the programs assigned by the operating system 12 to that CPU 4a, 4b, 4c ... 4n. In the illustrated embodiment, the operating system 12 may permit preemptive multitasking in which the operating system 12 parcels out CPU time slices to each program. It is appreciated that other embodiments may use other types of multitasking such as cooperative multitasking in which each program can control an assigned CPU 4a, 4b, 4c ... 4n for as long as it needs it. If a program is not using the assigned CPU 4a, 4b, 4c ... 4n, however, it can allow another program to use it temporarily.

The operating system 12 of the illustrated embodiment is also capable of multithreading, that is, executing different parts of a task or program, called threads, concurrently. The operating system 12 is responsible for allocating the system resources to competing processes, including competing threads and competing programs in a reasonable manner. This allocation is typically done by the task scheduler 23 in the illustrated embodiment.

In the illustrated embodiment, the selection of a particular processor on which to execute an interrupt handler task or process 21a, 21b ... 21n is preferably performed by the associated device driver 18a, 18b ... 18n rather than the operating system 12. Moreover, selection of a processor by the device driver 18a, 18b ... 18n is dynamic, based upon changing processor workloads. More specifically, each device driver 18a, 18b ... 18n temporarily pins its associated interrupt handler task 21a, 21b ... 21n to a particular processor or CPU 4a, 4b, 4c ... 4n based upon the level of usage of the CPU's in the system. All interrupt handlers 21a, 21b ... 21n associated with a device driver 18a, 18b ... 18n are executed by the particular CPU 4a, 4b, 4c ... 4n pinned by the device driver 18a, 18b ... 18n so long as usage of the CPU's 4a, 4b, 4c ... 4n does not change significantly. However, should the usage of the pinned CPU 4a, 4b, 4c ... 4n change significantly as compared to the usage of another CPU 4a, 4b, 4c ... 4n, a device driver 18a, 18b ... 18n can unpin the more heavily used CPU 4a, 4b, 4c ... 4n and pin a different, less heavily utilized CPU 4a, 4b, 4c ... 4n for subsequent execution of the interrupt handlers 21a, 21b ... 21n of the device driver 18a, 18b ... 18n.

For example, if the device driver for device 10a is device driver 18a, the device driver 18a can pin a particular CPU such as CPU 4b, for example, such that the interrupt handler 21a of device driver 18a is executed by CPU 4b each time device 10a generates an interrupt. However, should the usage of the pinned CPU 4b increase significantly as compared to the usage of another CPU 4a, 4c ... 4n, the device driver 18a for device 10a can unpin the more heavily used CPU 4b and pin a different, less heavily utilized CPU such as CPU 4c so that CPU 4c executes the interrupt handlers 21a of the device driver 18a for each subsequent interrupt by device 10a until the device driver 18a pins a different CPU to execute the interrupt handlers 21a for the device 10a. Each of the other device drivers 18b, 18c ... 18n can dynamically pin the same or a different CPU of the CPU's 4a, 4b, 4c ... 4n to execute the interrupt handlers 21b, 21c ... 21n associated with each device driver 18b, 18c ... 18n.

Figure 2:
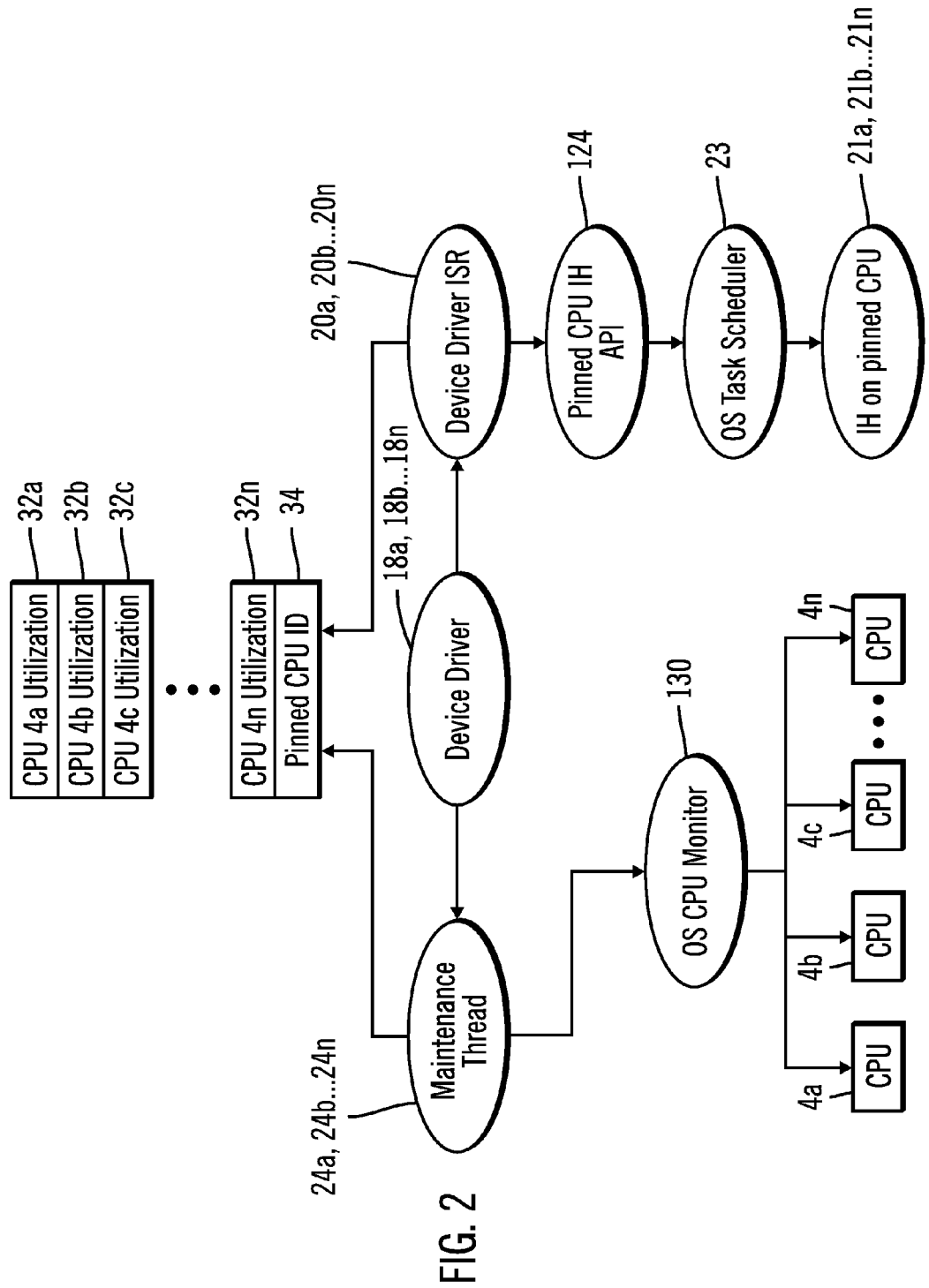
FIG. 2 illustrates operations by a device driver to handle interrupts generated by an associated device in accordance with described implementations of the invention.

FIG. 2 shows a diagram of an exemplary device driver 18a, 18b ... 18n spawning a maintenance thread 24a, 24b, 24c ... 24d which periodically determines the current utilization of each CPU 4a, 4b ... 4n in the system. The device driver 18a, 18b ... 18n can use this data to calculate the changing workload of each CPU 4a, 4b ... 4n over time. This utilization data may be stored for each device driver 18a, 18b ... 18n in a memory location 32a, 32b, 32c and 32d, for each CPU 4a, 4b, 4c ... 4n, respectively. The identity (ID) of the CPU 4a, 4b, 4c ... 4n currently selected or pinned to execute the interrupt handlers 21a, 21b ... 21n of a particular device driver 18a, 18b ... 18n may be stored in another storage location 34. In the illustrated embodiment, each device driver maintenance thread 24a, 24b ... 24n may have an associated data structure including memory locations 32a, 32b ... 32n to store the CPU utilization data obtained by that particular maintenance thread and a memory location 34 to store the CPU ID for the particular CPU 4a, 4b ... 4n pinned by that particular device driver maintenance thread.

the workload of the CPU 4a, 4b ... 4n currently selected to execute the interrupt handler 21a, 21b ... 21n for the device driver 18a, 18b ... 18n increases, the device driver maintenance thread 24a, 24b .... 24n may opt to select a different, lesser utilized CPU on which its interrupt handlers 21a, 21b ... 21n should subsequently be executed. In which case, the device driver maintenance thread 24a, 24b, 24c ... 24d stores the ID of the new CPU 4a, 4b, 4c, 4d in the "Pinned CPU ID" storage location 34.

When the device 10a, 10b ... 10n of the device driver 18a, 18b ... 18n generates an interrupt, the operating system 12 enables an interrupt handler thread 21a, 21b ... 21n to be subsequently spawned by the device driver 18a, 18b ... 18n of that device 10a, 10b ... 10n to handle that interrupt. The spawned interrupt handler thread 21a, 21b ... 21n is placed by the operating system 12 into the queue of the particular CPU 4a, 4b, 4c ... 4n which was pinned by the maintenance thread 24a, 24b ... 24n of the device driver 18a, 18b ... 18n for that device 10a, 10b ... 10n.

Figure 3:
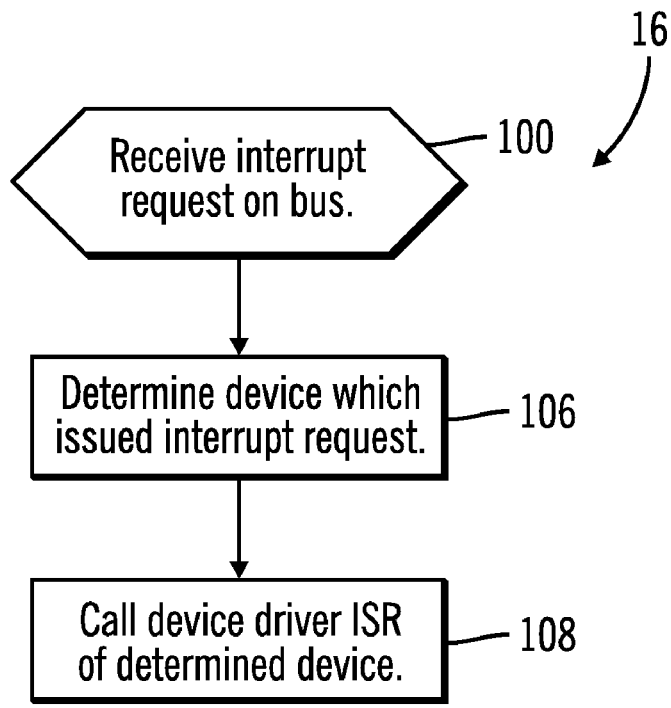
FIG. 3 illustrates operations performed by the operating system to handle an interrupt in accordance with described implementations of the invention.

For example, FIG. 3 illustrates operations performed by an operating system interrupt service routine (ISR) 16 which may respond to the generation of a device interrupt. Upon receipt of an interrupt (block 100), the O/S ISR 16 determines (block 106) the identity of the particular device 10a ... 10n (FIG. 1) which generated the interrupt. The device driver interrupt service routine (ISR) 20a, 20b ... 20n of the particular device 10a, 10b ... 10n which generated the interrupt is then called (block 108) by the O/S ISR 16. The calling of the device driver ISR 20a, 20b ... 20n is represented by the spawning of the device driver ISR thread 20a, 20b ... 20n in FIG. 2.

Figure 4:
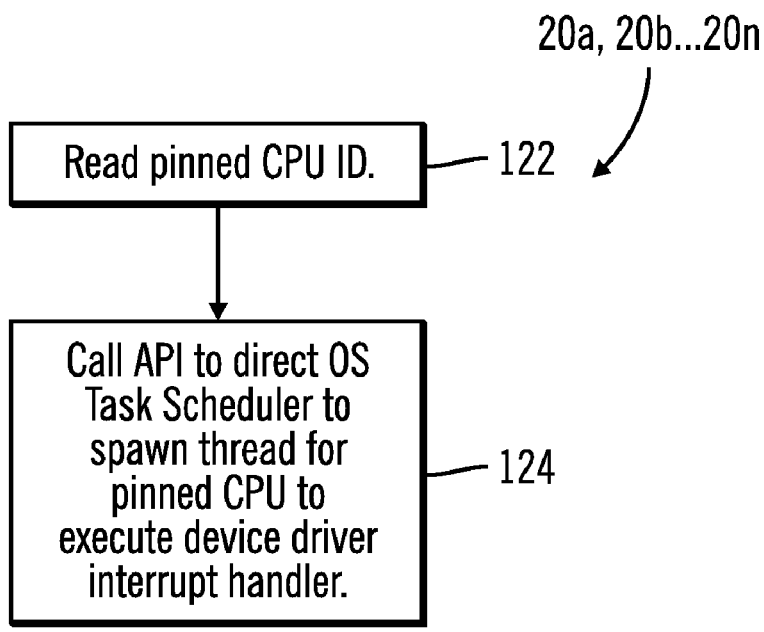
FIG. 4 illustrates operations performed by the device driver to handle an interrupt in accordance with described implementations of the invention.

FIG. 4 shows an example of operations performed by a device driver ISR thread 20a, 20b ... 20n which may respond to the O/S ISR 16. The device driver ISR 20*a*, 20*b* . . . 20*n* reads (block 122) the identity of the CPU 4*a*, 4*b*, 4*c* . . . 4*n* which has been pinned by the device driver maintenance thread 24*a*, 24*b* . . . 24*n*. As previously mentioned in reference to FIG. 2, the maintenance thread 24*a*, 24*b*, 24*c* . . . 24*n* stores the identity of the pinned CPU 4*a*, 4*b*, 4*c* . . . 4*n* in a storage location 34 of a data structure for that particular maintenance thread. The device driver ISR thread 24*a*, 24*b* . . . 24*n* reads the identity of the pinned CPU 4*a*, 4*b*, 4*c* . . . 4*n* from this memory location 34 and calls (block 124, FIGS. 2, 4) the operating system task scheduler 23 (FIG. 2) to spawn an interrupt handler thread 21*a*, 21*b* . . . 21*n* for the pinned CPU 4*a*, 4*b*, 4*c* . . . 4*n* to execute the interrupt handler for that device driver 18*a*, 18*b* . . . 18*n*. In the illustrated embodiment, the call to the operating system task scheduler 23 may be accomplished using an application program interface (API) call by the device driver ISR 20*a*, 20*b* . . . 20*n* which pins the particular CPU 4*a*, 4*b* . . . 4*n* to execute the interrupt handler 21*a*, 21*b* . . . 21*n* as indicated in FIGS. 2 and 4. It is appreciated that tasks may be pinned to a particular CPU in a variety of approaches, depending upon the particular operating system.

In response to the pinned CPU interrupt handler API, the task scheduler 23 (FIG. 2) places the interrupt handler thread 21*a*, 21*b* . . . 21*n* into the queue of the CPU 4*a*, 4*b*, 4*c* . . . 4*n* pinned by the device driver 18*a*, 18*b* . . . 18*n* to await execution. The next time the device 10*a*, 10*b* . . . 10*n* associated with a device driver 18*a*, 18*b* . . . 18*n* generates another interrupt, the operating system ISR 20*a*, 20*b* . . . 20*n* 16 (FIG. 3) will again identify the device driver 18*a*, 18*b* . . . 18*n* associated that device, call the device driver ISR 20*a*, 20*b* . . . 20*n* (FIG. 4) of that device driver which will then cause another interrupt handler thread 21*a*, 21*b* . . . 21*n* to be executed by the same pinned CPU 4*a*, 4*b*, 4*c* . . . 4*n*. In this manner, all subsequent interrupt handlers 21*a*, 21*b* . . . 21*n* for a particular device driver 18*a*, 18*b* . . . 18*n* will be executed by the same pinned CPU 4*a*, 4*b*, 4*c* . . . 4*n* until the device driver's maintenance thread 24*a*, 24*b*, 24*c* . . . 24*d* pins a different CPU 4*a*, 4*b*, 4*c* . . . 4*n*.

It is appreciated that there are various selection criteria which may be used for deterring when to change the pinned CPU 4*a*, 4*b*, 4*c* . . . 4*n* from one CPU 4*a*, 4*b*, 4*c* . . . 4*n* to another. For example, a device driver 18*a*, 18*b* . . . 18*n* might use a fixed margin or threshold to determine when to pin its interrupt handler 21*a*, 21*b* . . . 21*n* to a different CPU 4*a*, 4*b* . . . 4*n*. If the utilization of the current CPU exceeds the utilization of another available CPU by more than this margin, the driver 18*a*, 18*b* . . . 18*n* might decide to switch its interrupt handler 21*a*, 21*b* . . . 21*n* to the other, less utilized processor. For example, a margin of 15% may be selected for comparison purposes. If the utilization of the CPU 4*a*, 4*b*, 4*c* . . . 4*n* currently pinned by the device driver 18*a*, 18*b* . . . 18*n* is determined to be 50%, for example, and the utilization of another available CPU 4*a*, 4*b*, 4*c* . . . 4*n* is determined to be less than 35%, this lesser utilized processor could then be pinned by the device driver 18*a*, 18*b* . . . 18*n* in place of the CPU 4*a*, 4*b*, 4*c* . . . 4*n* being utilized at 50%. It is appreciated that other margins or thresholds may be selected as well.

Monitoring of the utilization of the CPU's 4*a*, 4*b*, 4*c* . . . 4*n* or other processors of the system is typically performed by the operating system 12. FIG. 2 depicts operations of an operating system CPU Monitor 130 which monitors the utilization of each of the processors or CPU's 4*a*, 4*b*, 4*c* . . . 4*n* of the system. The measured utilization may be on an instantaneous basis, an average or weighted average basis, a trend basis or other statistical basis.

The maintenance thread 24*a*, 24*b*, 24*c* . . . 24*d* spawned by the device driver 18*a*, 18*b* . . . 18*n* queries the operating system CPU Monitor 130 (FIG. 2) to obtain the utilization data for each CPU 4*a*, 4*b*, 4*c* . . . 4*n* available to execute the interrupt handlers 21*a*, 21*b* . . . 21*n* of that device driver 18*a*, 18*b* . . . 18*n*. The maintenance thread 24*a*, 24*b*, 24*c* . . . 24*d* can store the utilization data obtained from the operating system 12 for each CPU 4*a*, 4*b*, 4*c* . . . 4*n* directly into the associated memory locations 32*a* . . . 32 for that maintenance thread. In addition, the maintenance thread 24*a*, 24*b*, 24*c* . . . 24*d* can perform various statistical analyses on the utilization data including trend analyses, time averages etc. The results of the analyses may be stored in the associated memory locations as well. Thus, it is appreciated that a variety of statistical analyses may be utilized to determined whether the usage of the currently pinned CPU 4*a*, 4*b*, 4*c* . . . 4*n* "significantly" exceeds that of another CPU 4*a*, 4*b*, 4*c* . . . 4*n*.

Figure 5:
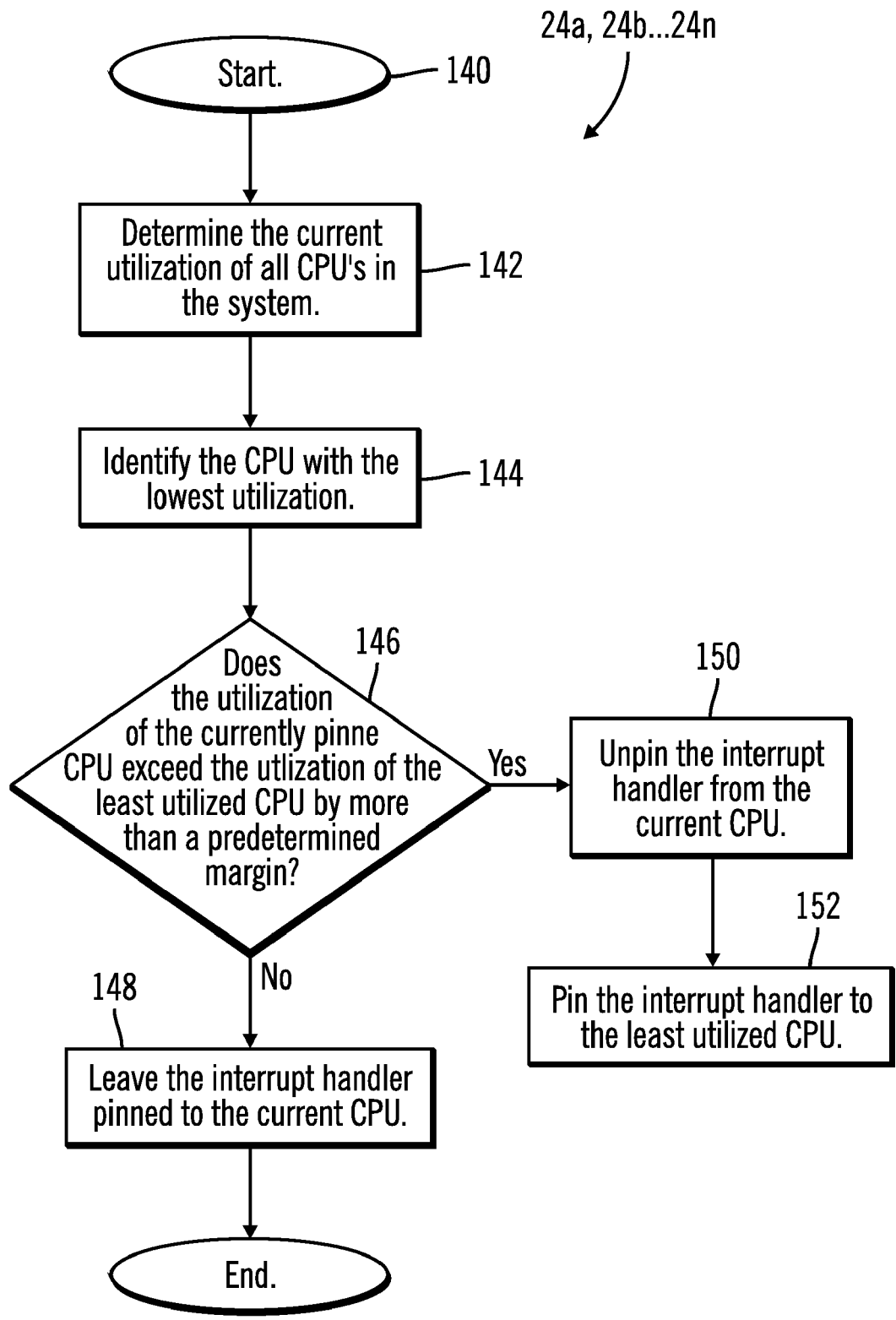
FIG. 5 illustrates operations performed by the device driver to handle an interrupt in accordance with described implementations of the invention.

If the maintenance thread 24*a*, 24*b* . . . 24*n* determines that there are multiple CPUs 4*a*, 4*b* . . . 4*n* which are being utilized significantly less than the currently pinned CPU, then the device driver maintenance thread 24*a*, 24*b* . . . 24*n* could select the CPU with the lowest utilization, for example. FIG. 5 shows an example of operations performed by a maintenance thread 24*a*, 24*b*, 24*c* . . . 24*d* which may be periodically called by the device driver 18*a*, 18*b* . . . 18*n* to monitor CPU usage and pin either the same or a different CPU 4*a*, 4*b* . . . 4*n* depending upon the detected CPU usage. At the start (block 140) of the maintenance thread 24*a*, 24*b*, 24*c* . . . 24*d*, a determination is made (block 142) as to the level of usage of the processors or CPU's 4*a*, 4*b* . . . 4*n* of the system. This determination may be made in a variety of ways but typically would include calls to the operating system 12 such as the OS CPU Monitor 130 (FIG. 2) to obtain the processor utilization data. Next, the maintenance thread 24*a*, 24*b* . . . 24*n* identifies (block 144) which of the multiple CPU's 4*a*, 4*b* . . . 4*n* currently has the lowest utilization. In this example, a comparison is made (block 146) between the utilization of the currently pinned CPU 4*a*, 4*b*, 4*c* . . . 4*n* to that of that lowest utilized CPU 4*a*, 4*b*, 4*c* . . . 4*n*. If the currently pinned CPU 4*a*, 4*b*, 4*c* . . . 4*n* is the lowest utilized CPU 4*a*, 4*b*, 4*c* . . 4*n* or if the utilization of the currently pinned CPU 4*a*, 4*b*, 4*c* . . . 4*n* does not exceed that of the lowest utilized CPU 4*a*, 4*b*, 4*c* . . . 4*n* by more than the predetermined margin, the pinned CPU 4*a*, 4*b*, 4*c* . . . 4*n* does not change (block 148). As noted above, the value of the margin or threshold may vary. One example is a margin of 15%. Thus if the difference in utilizations of the currently pinned CPU 4*a*, 4*b*, 4*c* . . . 4*n* and the lowest utilized CPU 4*a*, 4*b*, 4*c* . . . 4*n* is less than 15%, the maintenance thread can leave the pinned CPU 4*a*, 4*b*, 4*c* . . . 4*n* unchanged such that all subsequent interrupt handlers 21*a*, 21*b* . . . 21*n* will continue to be pinned to the same CPU 4*a*, 4*b*, 4*c* . . . 4*n*. Alternatively, if the difference in utilizations of the currently pinned CPU 4*a*, 4*b*, 4*c* . . . 4*n* and the lowest utilized CPU 4*a*, 4*b*, 4*c* . . . 4*n* is greater than 15%, the maintenance thread 24*a*, 24*b* . . . 24*n* can unpin the current CPU 4*a*, 4*b*, 4*c* . . . 4*n* (block 150) and pin (block 152) the new CPU 4*a*, 4*b*, 4*c* . . . . 4*n* determined to be the lowest utilized CPU 4*a*, 4*b*, 4*c* . . . 4*n*. As a consequence all subsequent interrupt handlers 21*a*, 21*b* . . . 21*n* for that particular device driver 18*a*, 18*b* . . . 18*n* will be executed by the newly pinned CPU 4*a*, 4*b*, 4*c* . . . 4*n* until the maintenance thread 24*a*, 24*b* . . . 24*n* pins a different CPU 4*a*, 4*b*, 4*c* . . . 4*n* because another CPU 4*a*, 4*b*, 4*c* . . . 4*n* has a significantly lower utilization.

In the illustrated embodiment, each device driver 18*a*, 18*b* . . . 18*n* has a maintenance thread 24*a*, 24*b* . . . 24*n* to monitor CPU usage and a separate memory location 34 to pin a particular CPU to execute the interrupt handlers 21a, 21b . . . 21n associated with the particular driver. It is appreciated that in other embodiments, a common maintenance thread may be utilized by two or more or even all device drivers 18a, 18b . . . 18n such that a single, particular CPU 4a, 4b . . . 4n is pinned to execute all the interrupt handlers 21a, 21b . . . 21n of all the device drivers associated with the common maintenance thread until that common maintenance thread pins another, lesser utilized CPU. It is further appreciated that usage of a storage location such as location 34 will vary between different embodiments. For example, in Microsoft Windows, this storage is transparent to the driver; the driver can merely tell the operating system once where to run its interrupt handling thread. After that, the driver need not specify the desired CPU until the driver wishes to switch to a different CPU.

Additional Embodiment Details

The described techniques for handling device interrupts may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, the interrupt handling implementations are included in a computer to handle interrupts from devices coupled to a bus enabling communication with the computer. In alternative implementations, the interrupt handling implementations may be implemented in any type of electronic device communicating with other devices, such as a hand held computer, a palm top computer, a laptop computer, a network switch or router, a telephony device, a network appliance, a wireless device, etc.

In the described embodiments, certain operations were described as being performed by the operating system ISR 16 and device driver 18a, 18b . . . 18n. In alterative embodiments, operations described as performed by the operating system ISR 16 may be performed by the device driver ISR 20a, 20b . . . 20n, and vice versa.

In the described implementations, the devices communicated an interrupt signal for an I/O request over an interrupt line of the bus. In alternative implementations, the devices may signal an interrupt in a different manner than through a bus interrupt signal.

FIG. 2 illustrates certain information maintained in computer memory. In alternative implementations, additional or different types of information may be maintained.

The illustrated operations of FIGS. 3-5 show certain events occurring in a certain order. In alternative embodiments, certain operations may be performed in a different order, modified or removed. Morever, steps may be added to the above described logic and still conform to the described embodiments. Further, operations described herein may occur sequentially or certain operations may be processed in parallel. Yet further, operations may be performed by a single processing unit or by distributed processing units.

In certain implementations, the device driver may be included in a computer system including a storage controller, such as a SCSI, IDE, etc. controller, that manages access to a non-volatile storage device, such as a magnetic disk drive, tape media, optical disk, etc. Such computer systems often include a desktop, workstation, server, mainframe, laptop, handheld computer, etc. In alternative implementations, the device driver embodiments may be included in a system that does not include a storage controller, such as certain hubs and switches.

In certain implementations, data may be transmitted on a cable connected to a port. Alternatively, embodiments may be configured to transmit data over a wireless network or connection, such as wireless LAN, Bluetooth, etc.

Figure 6:
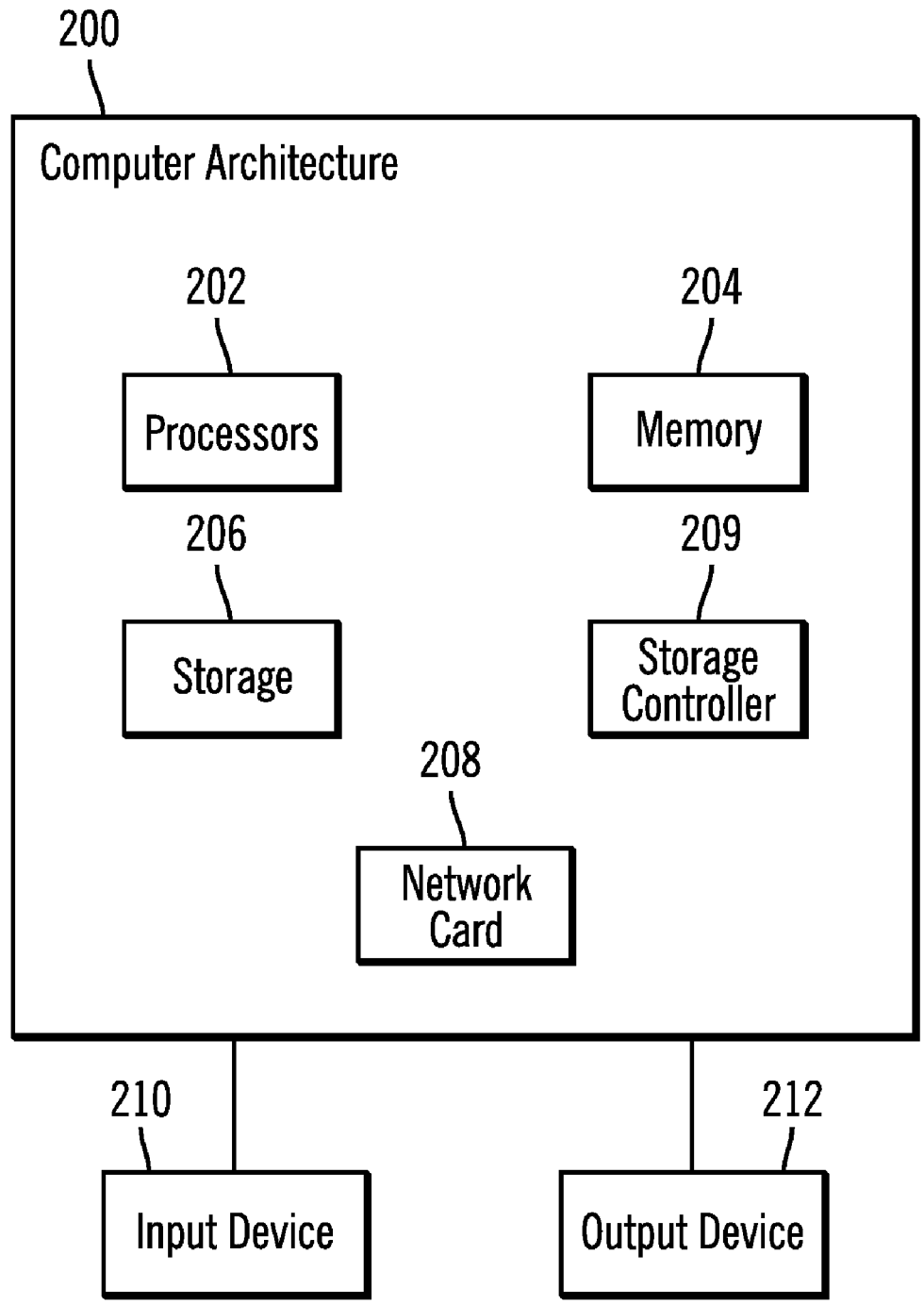
FIG. 6 illustrates a computer architecture that may be used with the described embodiments.

FIG. 6 illustrates one implementation of a computer architecture 200 of a computer such as the computer in FIG. 1. The architecture 200 may include a plurality of processors 202 (e.g., microprocessors), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processors 202 in a manner known in the art. The architecture further includes a network card 208 to enable communication with a network, such as an Ethernet, a Fibre Channel Arbitrated Loop, etc. Further, the architecture may, in certain embodiments, include a storage controller 209 to manage input/output (I/O) access to the data storage, where the storage controller 209 may be implemented on a storage card or device or integrated on integrated circuit components mounted on the motherboard. As discussed, certain of the network devices may have multiple network cards. An input device 210 is used to provide user input to the processors 202, and may include a keyboard, mouse, pen-stylus, microphone, touch sensitive display screen, or any other activation or input mechanism known in the art. An output device 212 is capable of rendering information transmitted from the processors 202, or other component, such as a display monitor, printer, storage, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of executing tasks in a multi-processor system, comprising:

executing a device driver to select a processor to execute an interrupt handler task wherein said device driver executing includes a first monitoring of usage of a plurality of processors in said system and selecting, as a function of said first monitoring, a processor as the currently selected processor to execute an interrupt handler task; and executing an operating system scheduler to assign an interrupt handler task to said processor selected by said device driver.

2. The method of claim 1 further comprising operating the processor selected by said device driver and assigned by said operating system scheduler to execute an interrupt handler task in response to an interrupt.

3. The method of claim 1 wherein said device driver executing includes a second monitoring of usage of a plurality of processors in said system and selecting, as a function of said second monitoring, either the currently selected processor or a different processor to execute an interrupt handler task.

4. The method of claim 3 wherein said device driver executing includes identifying the processor with the lowest usage, comparing the usage of the lowest usage processor to the usage of the currently selected processor and selecting the lowest usage processor to execute an interrupt handler task if the usage of the currently selected processor exceeds the usage of the lowest usage processor.

5. The method of claim 4 wherein said device driver executing includes selecting the currently selected processor to execute an interrupt handler task if the usage of the currently selected processor exceeds the usage of the lowest usage processor by less than a predetermined margin of usage.

6. The method of claim 3 wherein said device driver executing includes identifying the processor with the lowest usage, comparing the usage of the lowest usage processor to the usage of the currently selected processor and selecting the lowest usage processor to execute an interrupt handler task if the usage of the currently selected processor exceeds the usage of the lowest usage processor by a predetermined margin of usage.

7. The method of claim 3 wherein said device driver executing includes selecting the currently selected processor to execute an interrupt handler task if the usage of the currently selected processor is the lowest.

8. A system in communication with data storage, comprising:
    a plurality of processors;
    a storage controller adapted to manage Input/Output (I/O) access to the data storage;
    a device driver capable of execution by at least one processor to select one processor to execute an interrupt handler task wherein said device driver executing includes a first monitoring of usage of a plurality of processors in said system and selecting, as a function of said first monitoring, a processor as the currently selected processor to execute an interrupt handler task; and
    an operating system scheduler capable of execution by at least one processor to assign an interrupt handler task to said processor selected by said device driver.

9. The system of claim 8, further comprising:
    an interrupt handler task capable of execution by the selected processor in response to an interrupt.

10. The system of claim 8 wherein said device driver is capable of execution by at least one processor to subsequently monitor usage of a plurality of processors in said system and to select, as a function of said subsequent monitoring, either the currently selected processor or a different processor to execute an interrupt handler task.

11. The system of claim 10 wherein said device driver is capable of execution by at least one processor to identify the processor with the lowest usage, to compare the usage of the lowest usage processor to the usage of the currently selected processor and to select the lowest usage processor to execute an interrupt handler task if the usage of the currently selected processor exceeds the usage of the lowest usage processor.

12. system of claim 11 wherein said device driver is capable of execution by at least one processor to select the currently selected processor to execute an interrupt handler task if the usage of the currently selected processor exceeds the usage of the lowest usage processor by less than a predetermined margin of usage.

13. The system of claim 10 wherein said device driver is capable of execution by at least one processor to identify the processor with the lowest usage, to compare the usage of the lowest usage processor to the usage of the currently selected processor and to select the lowest usage processor to execute an interrupt handler task if the usage of the currently selected processor exceeds the usage of the lowest usage processor by a predetermined margin of usage.

14. The system of claim 10 wherein said device driver is capable of execution by at least one processor to select the currently selected processor to execute an interrupt handler task if the usage of the currently selected processor is the lowest.

15. An article of manufacture including a device driver, wherein the device driver executes in an operating system having an operating system scheduler and interrupt task handler, capable of executing tasks in a multi-processor system, wherein the device driver causes operations to be performed, the operations comprising:
    selecting a processor to execute an interrupt handler task wherein said device driver selecting includes a first monitoring of usage of a plurality of processors in said system and selecting, as a function of said first monitoring, a processor as the currently selected processor to execute an interrupt handler task, wherein the operating system schedule assigns the interrupt handler task to said processor selected by said device driver.

16. The article of manufacture of claim 15 wherein said device driver operations include a second monitoring of usage of a plurality of processors in said system and selecting, as a function of said second monitoring, either the currently selected processor or a different processor to execute an interrupt handler task.

17. The article of manufacture of claim 16 wherein said device driver operations include identifying the processor with the lowest usage, comparing the usage of the lowest usage processor to the usage of the currently selected processor and selecting the lowest usage processor to execute an interrupt handler task if the usage of the currently selected processor exceeds the usage of the lowest usage processor.

18. The article of manufacture of claim 17 wherein said device driver operations include selecting the currently selected processor to execute an interrupt handler task if the usage of the currently selected processor exceeds the usage of the lowest usage processor by less than a predetermined margin of usage.

19. The article of manufacture of claim 16 wherein said device driver operations include identifying the processor with the lowest usage, comparing the usage of the lowest usage processor to the usage of the currently selected processor and selecting the lowest usage processor to execute an interrupt handler task if the usage of the currently selected processor exceeds the usage of the lowest usage processor by a predetermined margin of usage.

20. The article of manufacture of claim 16 wherein said device driver operations include selecting the currently selected processor to execute an interrupt handler task if the usage of the currently selected processor is the lowest.

* * * * *

UNITED STATES PATENT AND TRADEMARK OFFICE
CERTIFICATE OF CORRECTION

| | | |
|---|---|---|
| PATENT NO. | : 7,543,306 B2 | Page 1 of 1 |
| APPLICATION NO. | : 10/612694 | |
| DATED | : June 2, 2009 | |
| INVENTOR(S) | : D. R. Gaur | |

It is certified that error appears in the above-identified patent and that said Letters Patent is hereby corrected as shown below:

In the Claims

Column 10, Line 3, Claim 12, "system of" should read --The system of--.

Signed and Sealed this
Ninth Day of September, 2014

Michelle K. Lee
*Deputy Director of the United States Patent and Trademark Office*